May 1, 1951 — O. A. NELSON — 2,551,039

PORTABLE ELECTRIC ORCHARD HEATER

Filed May 1, 1950

Inventor,
Oscar A. Nelson;
By Frederick E. Maynard,
Attorney.

Patented May 1, 1951

2,551,039

UNITED STATES PATENT OFFICE 2,551,039

PORTABLE ELECTRIC ORCHARD HEATER

Oscar A. Nelson, Covina, Calif.

Application May 1, 1950, Serial No. 159,186

1 Claim. (Cl. 219—34)

This invention is an electrical heater designed for service in orchards or other large areas where there is urgent need for an efficient and quick distribution of frost-preventing heat.

Particularly, a purpose of the invention is to provide a compact, reasonably light-weight, hand portable heater using electricity as the heat source and which can be effectively and efficiently used in place of the several crude and smudge-making oil burning cans commonly used in orange groves.

It is an aim of the invention to provide a low cost, simple, sturdy and smokeless electrically energized portable heater which may be operated at a cost of heating energy not greater than the cost of the grade of oil used in smudge pots.

Importantly, it is an intent of the invention to provide a heater having high heat and weather resistance; that is, will have a longer service life than sheet-metal smudge pots.

The invention resides in certain advancements in this art as set forth in the ensuing disclosure and has, with the above, additional objects and advantages as will be made manifest in the following description of the herewith illustrative heater and the manner of operation and its means and details of construction; it being understood that modifications, variations, adaptations and equivalents may be resorted to within the scope, spirit and principles of the invention as it is claimed in conclusion hereof.

Figure 1:
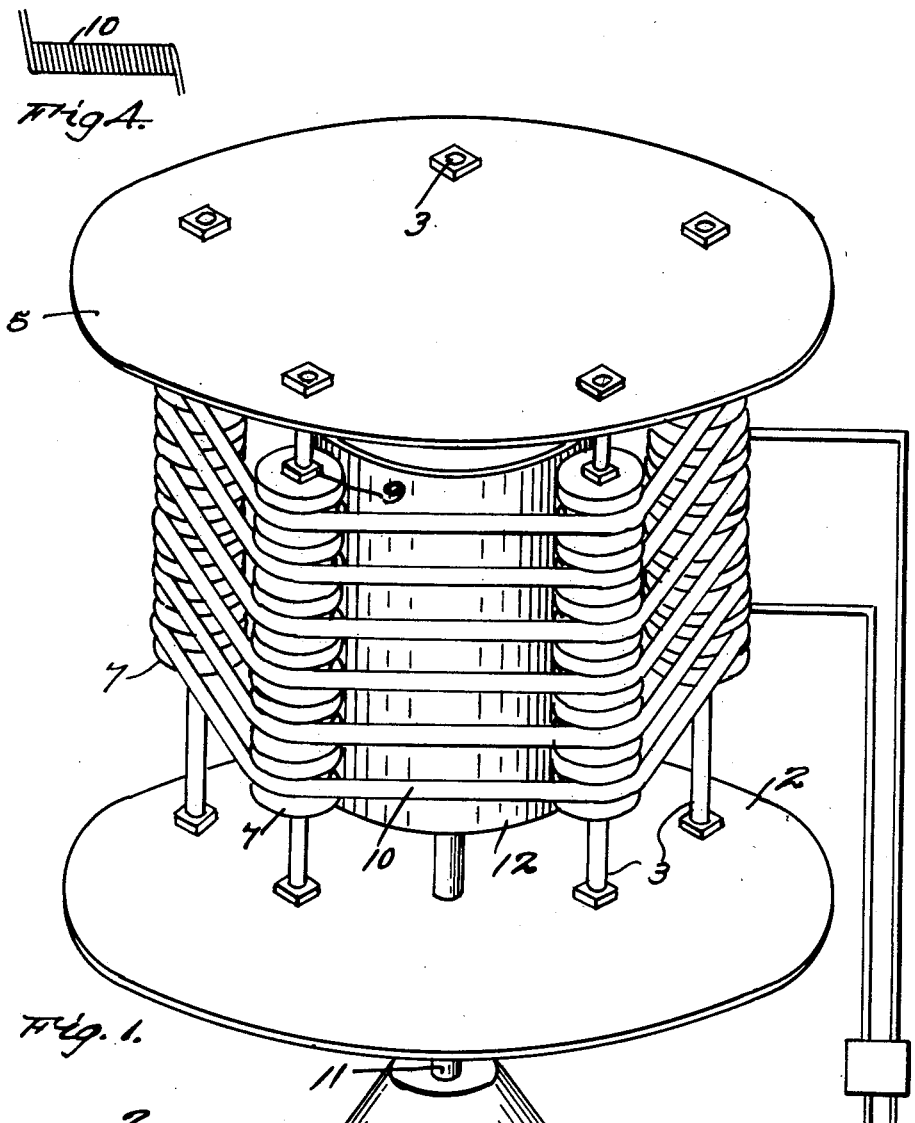
Figure 2:
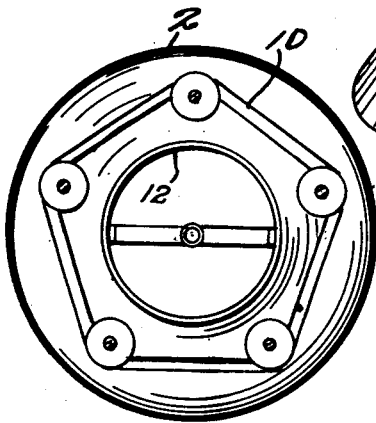
Figure 3:
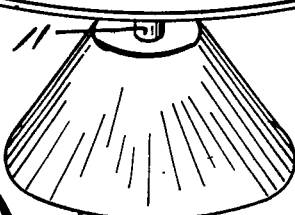

Figure 1 is a perspective of the heater. Figure 2 is a cross-section on a plane above the bottom plate. Figure 3 is a perspective of one of the insulating spools. Figure 4 is a side elevation of a fragment of the heating element.

As actually embodied, the heater includes a bottom, flat plate of suitable plan form and of a material and/or surface finish for advantageous heat reflection. This plate 2 is provided with a generally circular system of vertical bolt rods 3 with nuts for fixing the rods to the plate.

An upper reflector plate 5 is fixed on the upper end of the rods by respective nuts so that the plates are rigidly fixed at desired vertically spaced relation.

On each of the rods there is provided a suitable electrical insulating device which, in the present instance, consists of a stack of refractor spools 7 thereby providing positioning and retaining grooves 7g at desired spacing along each rod stack of spools. The stacks are held in situ by respective clamp nuts 8.

A suitable electrical resistance filament or heating element 10, itself of helically wound wire, is snugly coiled in a desired number of turns around the outermost grooved portions of the spool stacks of insulators on the upright rods. The horizontal distance between the stacks of insulators affords an overall extensive and effective length of the heating element. The heating element may be of one continuous length in several wraps around the cluster of insulators or there may be more than one wrapped in parallel manner and connected electrically in parallel.

The bottom plate 2 has a central base leg 11 which extends upwardly in the annular system of rods. And preferably there is affixed to this leg a cylindrical, efficient reflector 12 whereby to radially reflect heat rays coming inwardly from its surrounding heater element 10.

What is claimed is:

A hand-portable, heavy duty, electric orchard heater having in combination; a horizontal, plane, lower reflector plate and a like top reflector plate, a system of annularly spaced, vertical clamp bolts fixing said plates in vertically spaced relation, a basal leg supportingly fixed to the lower plate, a tubular electrical insulating device mounted on each of said bolts, and an electrical resistance heating element helically wound in spaced coils on and around the system of insulators from top to bottom thereof; said devices each consisting of a stack of spools each for a respective portion of said element.

OSCAR A. NELSON.

REFERENCES CITED

The following references are of record in the file of this patent:

UNITED STATES PATENTS

| Number | Name | Date |
|---|---|---|
| 1,840,168 | Mucher | Jan. 5, 1932 |
| 1,841,332 | Kranz | Jan. 12, 1932 |

FOREIGN PATENTS

| Number | Country | Date |
|---|---|---|
| 20,625/29 | Australia | June 24, 1930 |
| 39,839 | Norway | June 15, 1920 |
| 80,607 | Switzerland | Mar. 17, 1919 |
| 389,894 | Germany | Nov. 14, 1922 |
| 586,195 | Great Britain | Mar. 11, 1947 |